Jan. 14, 1969
R. A. REZNICEK
3,421,322
MASTER CYLINDER MALFUNCTION INDICATOR
Filed June 6, 1967
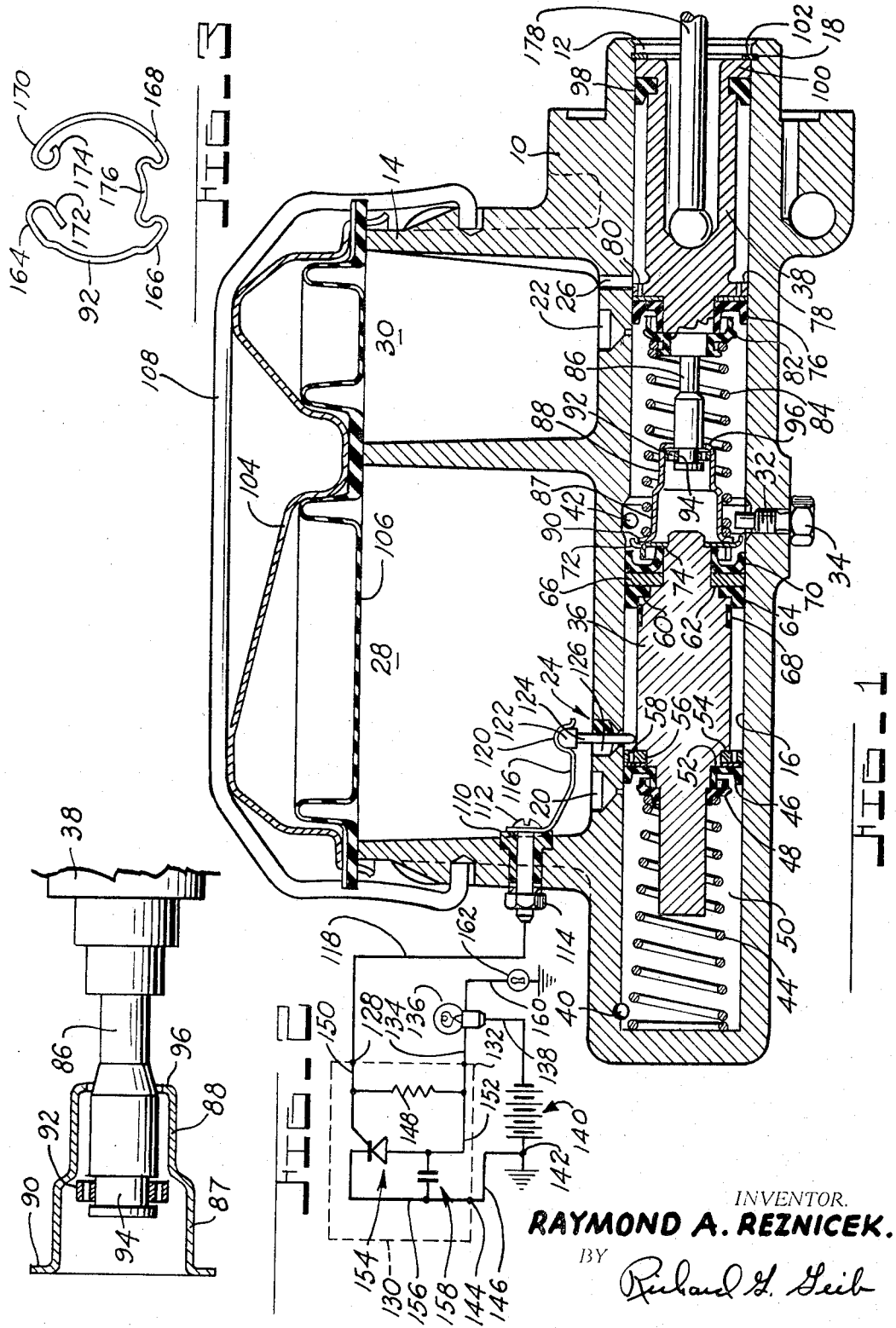
INVENTOR.
RAYMOND A. REZNICEK.
BY
Richard G. Geib
ATTORNEY.

United States Patent Office 3,421,322
Patented Jan. 14, 1969

3,421,322
MASTER CYLINDER MALFUNCTION INDICATOR
Raymond A. Reznicek, St. Joseph, Mich., assignor to The
Bendix Corporation, a corporation of Delaware
Filed June 6, 1967, Ser. No. 643,922
U.S. Cl. 60—54.6                                            11 Claims
Int. Cl. F15b 7/08; F60t 15/46; F60t 11/10

ABSTRACT OF THE DISCLOSURE

Warning signal switch means for a brake master cylinder utilizing a closed electrical circuit having in series a master cylinder secondary piston, the cage spring assembly, and the primary piston within the master cylinder.

Summary

With the advent of split system type master cylinders which provide fail-safe actuation of vehicular brakes, it has become apparent that the operator of the vehicle may not know of a malfunction within the brake system when, for example, one of the separate hydraulic systems provided by a split system master cylinder fails to develop sufficient pressure for the actuation of one portion of the brake system. It is, therefore, a principal object of this invention to provide an indicating means for a split system brake apparatus which will readily provide an operator with an indication of a malfunction.

It is another object of this invention to provide an indicator means which is integrated with a split system type master cylinder in a simple, practical and economical manner.

It is yet a more detailed object of this invention to provide an indicator of an electrical type which is sensitive to the travel of the secondary and/or primary pistons within the split system type master cylinder to brake the circuit and activate a device energizing the warning means; e.g., a light or buzzer.

Drawing description

Other objects and advantages will appear from the following description of the drawings in which:

FIGURE 1 is a cross sectional drawing of a split system type master cylinder incorporating a switch means in accordance with the principles of my invention; and FIGURE 2 is an enlarged view of the end of the primary piston showing a flat spring type clip free of the fitted neck of a top hat type spring retainer which would be the position of these elements in the event of a primary chamber failure.

FIGURE 3 is an enlarged view of a spring retainer employed by the principles of this invention for maintaining electrical contact via the master cylinder elements.

Detailed description

With more particular regard to FIGURE 1, there is shown a master cylinder housing 10 which, as will be familiar to those skilled in the art to which this invention relates, is adaptable to be mounted upon a firewall for an automobile or upon a shell of a power servomotor that is in turn connected to the firewall of the automobile for operation by a brake pedal within the operator's compartment.

The housing is preferably formed by casting to have an internal open ended bore 12 and a reservoir housing 14 formed therewith. After casting, the housing is then machined to have smooth sidewalls 16, a retainer groove 18, fluid return ports 20 and 22 and fluid filling ports 24 and 26. More particularly, the ports are drilled through the walls of the bore 12 to communicate reservoir chambers 28 and 30 to the bore 12. Also the housing is drilled and tapped as at 32 for the receipt of a stop bolt 34 after the assembly internally of the bore 12 of the secondary piston 36 and the primary piston 38. Finally, outlet ports 40 and 42 are drilled through the housing. As may be appreciated by those skilled in the art, the machining of the smooth surfaces 16 for the bore 12 is the last step in the operation after the drilling of the aforementioned ports.

By way of describing the assembly of the secondary and primary pistons into the bore 12, secondary piston 36 has assembled to it the ring 56, seal 46, non-conductive plastic retainer 48 and return spring 44, and then it is placed within the bore 12 with the return spring 44 abutting the end of the bore to create a secondary variable volume chamber 50 between the piston 36 and the end wall of the bore. The piston 36 is formed with shoulders 52 and 54 for, respectively, backing up the seal 46 and a ring 56 having a plurality of axial passages 58, which ring 56 is of an axial dimension as to normally permit a space between the seal 46 and its forward surface. Likewise, the rear face of the secondary piston 36 is formed with shoulders 60 and 62 for mounting a secondary seal 64 and a ring 66, and it is provided with a groove for the receipt of a flat rubber ring 68 adjacent to and extending forwardly from the secondary seal 64 along the peripheral surfaces of the piston 36. Next a rearwardly facing lip seal 70 is placed about the reduced rear portion of the piston 36 to rest against the ring 66 and a seal and spring retainer 72 is placed against a shoulder 74 of this reduced portion to confine the seal 70.

The next step in the assembling of the internal details of the master cylinder would be to insert the primary piston 38 and its caged spring assembly into the bore 12. However, the caged spring means is first assembled to the primary piston 38 by placing a lip seal 76 which is placed against a flange 78 of the primary piston 38, which flange has a plurality of spaced openings 80 drilled axially therethrough. Next an insulating type spring retainer 82 is fitted over the forward end of the primary piston 38 and a spring 84 is placed over a stop pin 86 on the retainer 82. Then a top hat type retainer having a stepped diameter with a larger end 87 forwardly of a smaller end 88 is placed over the stop pin 86. The top hat retainer has a radial flange 90 which abuts the forwardmost coils of the spring 84 and by moving the top hat retainer to compress the spring 84, a spring clip 92 is placed within a groove 94 of the stop pin 86. Upon release of the top hat retainer it will move forwardly until inwardly turned flanges 96 at the rear of the reduced portion 88 engage the spring retainer 92. Thereafter a secondary seal 98 is placed within a groove of the primary piston 38 ahead of the rearward flange 100 thereof, and it is inserted into the bore until the top hat retainer bears upon the seal and spring retainer 72 of the secondary piston 36. By compressing the return spring 44 with force on the primary piston 38 that is transmitted via the caged spring 84 through the secondary piston 36, the elements are pushed inwardly of the bore 12 until a snap ring 102 may be inserted into the groove 18. Thereafter the force is removed from the piston 38 and it returns until its rearward flange 100 bears upon the snap ring 102 forming the rearward stop, and the stop bolt 34 is assembled within the tapped opening 32 to provide the return stop for the secondary piston 36.

The annular wall of the reservoir is drilled and counterbored for the receipt of an electrical insulator 110. As seen, the insulator 110 is tubular and a bolt is inserted therethrough and provided with a nut 114 for attaching a spring 116 under bolt head and an electrical lead 118 between nuts on the other end, one of which (114) is shown. The spring clip 116 is provided with a socket 120 bearing on a spherical head 122 of a contact pin 124 positioned within the filler opening 24 by an insulator block having a passageway 126 so that there is no interference in the communication of a fluid within the reservoir cavity 28 to the chamber about the piston 36 between the lip seals 46 and 64. As seen, the contact pin 124 is thereby urged by the spring clip 116 to ride on the peripheral surfaces of the secondary piston 36.

As seen, the electrical lead 118 is connected to a terminal 128 of a control box 130 shown in dashed line which also has another terminal 132 to which a lead 134 is connected leading to the ground side of a warning light 136. The positive side of the warning light 136 is connected by a lead 138 to the vehicle storage battery 140 which is grounded by means of the electrical lead 142 which in the schematic shown also connects to the control box 130 at the terminal 144 by means of lead 146. Within the control box, as schematically shown there is a resistor 148 connected between electrical leads 150 and 152 respectively connected to the terminals 128 and 132. The lead 150 is connected to the gate of a silicone diode rectifier 154, as well as is the lead 152. The ground terminal 144 of the control box 130 is connected by a lead 156 to the rectifier 154 and a condenser 158 is placed between the leads 156 and 152 to eliminate electrical surges as the electrical circuit is closed down from operating the rectifier 154 and thereby tricking the operation of the warning light 136 when it is not desired. The electrical circuit is completed by attaching a lead 160 from an ignition switch 162 so that the light 136 may be tested whenever the ignition switch is turned to a start position communicating the ground connection of the ignition switch to the light 136.

The master cylinder assembly is completed by the assembly to the reservoir of the cap 104, its sealing diaphragm 106, as by the spring clip 108. The manner by which the spring retainer 92 fits within the groove 94 of the stop pin 86 for the primary piston 38 is shown in clearer detail by the enlargement of the assembly therewith of the top hat retainer, as seen in FIGURE 2. It should be noted that in the attitude of these elements shown by FIGURE 2 the spring retainer has moved out of contact with the inner surfaces of the small diameter portion 88 of the top hat retainer, and that the spring 84 is not shown between the top hat retainer and the primary piston 38.

With reference now to FIGURE 3, the spring clip 92 is shown in even a still further enlarged detail to bring out the design which embodies four surfaces of revolution 164, 166, 168 and 170 which are urged outwardly by the spring fingers 172 and 174 bearing on the peripheral surfaces of the groove 94 in association with the bridge 176 to maintain contact of the spring clip 92 with the inner surfaces of the small diameter portion 88 of the top hat retainer whenever the spring 92 is against the flanges 96 and for the normal travel of the piston 38 so long as the braking system to which the master cylinder is applied is in normal operative condition with respect to the pressure utilized from the outlet 42.

*Operation*

In operation, it is expected that those skilled in the art to which this invention relates will understand that during normal operation of the unit a force upon the push rod 178, as will be caused by the operator of the vehicle depressing a brake pedal (not shown), will cause the primary piston 38 to move inwardly of the bore 12, and, as the caged spring 84 will be stronger than the return spring 44, this movement will first be transmitted directly to the secondary piston 36 to immediately begin pressurization of the chamber 50. As soon as pressure begins to develop in the chamber 50, the combined effect of this pressure and the force of the spring 44 in a compressed attitude will cause the relative motion of the primary piston 38 with respect to the secondary piston 36 to also begin pressurization of the chamber therebetween to deliver pressurized fluid to the outlet 42.

During normal operation, the travel of both the secondary piston 36 and the primary piston 38 will not be sufficient to respectively cause the pin 124 to overlie the insulator sleeve 68, nor the removal of the spring retainer 92 from within the small diameter portion 88 of the top hat spring retainer of the cage spring assembly.

Thus, the 12 volt potential from the storage battery 140 will be available to the positive side of the warning light 136; whereas due to the combined resistances of the rectifier and the resistor 148 in the control box 130 there will only be about .004 ampere flow of current to the negative side of the light 136. Thus, the light 136 will not operate even though the circuit is closed because of the high resistances.

However, the event that the secondary piston travels abnormally, which would indicate a failure in the brake system ahead of the discharge 40, the pin 124 will overlie the insulator sleeve or ring 68 so as to break this circuit and provide an electrical resistance of the fluid connection in the master cylinder to the gate of the rectifier which then opens the direct ground connection in the control box 130 to the terminal 132 whereby the light 136 is operated to indicate a failure.

In the event of a failure in the primary chamber whereby, for example, a hose breaks beyond the outlet 42, the spring clip 92 will move from within the small diameter portion 88 of the top hat retainer to the large diameter portion 87. This again breaks the direct connection of the gate of the rectifier to ground, and due to the electrical resistance of the fluid applies a voltage to the gate of the rectifier to also fire it and actuate the light 136.

If there has been a failure the turning off of the ignition resets the rectifier 154. A condenser 158 prevents the tricking of the rectifier into firing whenever the electrical load surges in the vehicle electrical system.

Having fully described an operative arrangement of my invention I should now like to set forth the protection I seek by the following claims.

I claim:
1. A split fluid actuator having a caged spring means between first and second movable walls operatively arranged within a housing for developing separate fluid pressures, said caged spring means comprising:
   a spring operatively connected to said first movable wall;
   a top-hat spring retainer having a body within said spring and a flange operatively engaging said spring on one side and said second movable wall on the other side;
   a caging means connected through said body to said first movable wall; and
   a spring contact removably connected to said caging means to provide a direct structural electrical current path from said second movable wall to said first movable wall and vice versa so long as said spring contact is connected to said spring retainer which is interrupted when said spring contact is disengaged from said body.

2. The structure of claim 1 and further comprising an electrical warning mechanism actuatable by increased resistance to current flow, said mechanism being operatively connected to a contact within said master cylinder operatively engaging said second movable wall.

3. The structure of claim 2 wherein said second movable wall includes an insulating ring normally spaced from said contact and movable thereunder to break the structural current path through said actuator and cause it to flow from the contact through the fluid to the housing whereby resistance is increased to actuate said electrical warning mechanism.

4. The structure of claim 1 wherein said spring contact has spring fingers and a bridge portion operatively engaging said caging means and biasing portions of said spring fingers into contact with inner surfaces of a smaller portion of said top hat spring retainer.

5. The structure of claim 2 wherein said contact is provided with an insulator body having fluid flow-through passages, said insulator body being operatively related in a hole from a fluid reservoir cavity into a bore for said movable walls to locate said contact on the peripheral surface of said second wall.

6. The structure of claim 5 wherein said contact is connected to an insulated terminal through said housing by a spring means biasing said contact onto said peripheral surface.

7. The structure of claim 6 and further comprising an electrical warning system including:
 an indicator;
 a power source having positive and negative sides one of which is connected to said indicator;
 an electrical mechanism connected to the other side of said power source having a rectifier and resistor in parallel, said rectifier connecting the said other side of said power source to said indicator and being connected to said insulated terminal with said resistor bridging this connection to that connecting said rectifier to said indicator.

8. The structure of claim 7 and further comprising a condenser connected between the other side of said power source and the connection of the electrical mechanism with said indicator to prevent tricking of said rectifier by electrical current surges upon shut-off of said power source by switch means.

9. The structure of claim 8 wherein said switch means includes circuitry to test said indicator whenever said switch means is operated to the on position.

10. For a split master cylinder a warning mechanism comprising:
 a means to provide a normally closed ground connection through the movable walls of said master cylinder which is changed to utilize the fluid therewithin to provide a resistance in the ground connection whenever said movable walls travel individually and collectively beyond a predetermined stroke thereof;
 an electrical mechanism connected to said means, said mechanism including a device operated by increased resistance to provide a non-resistant current path, said mechanism having a condenser to prevent tricking of said device by surging current; and
 an indicator connected to said electrical mechanism to be operated thereby whenever increased resistance is created in said master cylinder to trigger said device.

11. A master cylinder and normally closed electrical warning system to prevent electrolytic effect within said master cylinder, said system comprising:
 a master cylinder housing having a reservoir cavity and a fluid pressurizing bore in fluid communication;
 spring biased first and second movable walls in said bore controlling the fluid communication from said reservoir to close same when it is desired to build separate hydraulic pressures in said bore and including a caged spring assembly as the electrical connector for said first and second movable walls; and
 an electrical mechanism connected to a power supply and one of said first and second movable walls, said mechanism having a device sensitive to resistance in said master cylinder for completing a non-resistant electrical circuit and a condenser to prevent reverse power surges from inadvertently triggering said device.

References Cited

UNITED STATES PATENTS

| | | | |
|---|---|---|---|
| 3,147,596 | 9/1964 | Wallace | 60—54.6 |
| 3,228,194 | 1/1966 | Blair | 60—54.5 |

MARTIN P. SCHWADRON, *Primary Examiner.*

ROBERT R. BUNEVICH, *Assistant Examiner.*

U.S. Cl. X.R.

303—84; 188—152, 1, 151